United States Patent [19]

Schultz et al.

[11] Patent Number: 4,805,881
[45] Date of Patent: Feb. 21, 1989

[54] INTERNAL GAS GENERATOR FOR HEAT TREATING FURNACE

[75] Inventors: Thomas J. Schultz, Maumee; Deane A. Horne, Toledo, both of Ohio; Stephen J. Sikirica, Chicago, Ill.; James W. Bender, Toledo, Ohio

[73] Assignee: Gas Research Institute, Chicago, Ill.

[21] Appl. No.: 55,426

[22] Filed: May 28, 1987

[51] Int. Cl.[4] .............................................. C21D 1/76
[52] U.S. Cl. .................................. 266/257; 266/81; 422/211; 432/152; 432/198; 432/199
[58] Field of Search ............... 266/81, 257; 422/191, 422/211; 432/152, 198, 199

[56] References Cited

U.S. PATENT DOCUMENTS

| | | | |
|---|---|---|---|
| 2,142,678 | 1/1939 | Porter | 549/248 |
| 2,248,734 | 7/1941 | Barr | 518/706 |
| 2,254,047 | 8/1941 | Roth | 266/257 |
| 2,256,622 | 9/1941 | Murphree et al. | 518/706 |
| 2,283,499 | 5/1942 | Hachmuth | 585/533 |
| 2,423,835 | 7/1947 | Houdry | 585/602 |
| 2,423,907 | 7/1947 | Schulze | 208/120 |
| 2,589,811 | 3/1952 | Holcroft | 266/257 |
| 2,886,303 | 5/1959 | Rusciano | 266/257 |
| 3,635,943 | 1/1972 | Stewart | 208/157 |
| 3,796,655 | 3/1974 | Armistead et al. | 208/216 R |
| 3,968,957 | 7/1976 | Asai et al. | 266/257 |
| 4,289,855 | 9/1981 | Whitley | 435/287 |
| 4,331,632 | 5/1982 | Galloway | 422/206 |
| 4,457,493 | 7/1984 | Takahashi | 266/81 |
| 4,556,537 | 12/1985 | Honma | 422/49 |
| 4,571,325 | 2/1986 | Nikolov et al. | 422/191 |
| 4,590,044 | 5/1986 | Mos et al. | 422/191 |

FOREIGN PATENT DOCUMENTS 162941 9/1984 Japan .................... 266/257

OTHER PUBLICATIONS

Four (4) pages of Japanese publication entitled, "Netsu Shori" (meaning Heat Treating), published before Jun. 1984.

Primary Examiner—L. Dewayne Rutledge
Assistant Examiner—Robert L. McDowell
Attorney, Agent, or Firm—Body, Vickers & Daniels

[57] ABSTRACT

An internal gas generator in combination with a standard heat treat furnace is provided for producing either an endothermic product gas or a purge gas. The generator includes a reaction tube containing alternating packed beds of a highly active catalyst and inert heat transfer particulates. The reaction tube is surrounded by an elongated tubular heating element which heats the reaction tube, the combination producing an acceptable product gas in a small arrangement suitable for retrofit applications to existing furnaces. A flanged mounting permits the reaction tube to be easily removed for standard replacement in the event of catalyst poisoning and the like.

16 Claims, 3 Drawing Sheets

INTERNAL GAS GENERATOR FOR HEAT TREATING FURNACE

This invention relates to a gas generator and more particularly, to a gas generator in combination with a heat treat furnace.

The invention is particularly applicable to an internal, endothermic, gas generator used in standard heat treating furnaces operated at standard atmospheric pressure and will be described with particular reference thereto. However, it will be appreciated that the invention has broader applications and may be used in any application where a small, compact, high-output gas generator is desired to produce an endothermic or reducing gas.

BACKGROUND

Standard heat treat furnaces operated at atmospheric pressure or slightly above, whether of the batch or continous type, require the use of a protective, gas atmosphere when the workpiece is subjected to a heat treatment process within the furnace. Generally, an endothermic product gas or a reducing atmosphere is required for neutral hardening, annealing or carburizing. In some heat treatment processes, such as bright hardening, brazing, carbon restoration in forgings and bar stock, sintering powder metal preforms, bright annealing, and the clean neutral hardening of all grades of steel, a reducing atmosphere generated by an endothermic gas generator is sufficient to permit the desired heat treat process to be completed. In other heat treat processes, particularly those related to case hardening such as carburizing, carbonitriding, carbohydrate nitriding, cyaniding, etc., the reducing gas atmosphere functions as a carrier gas to which an enriching gas is added (i.e. methane for carburizing) to provide an atmosphere having sufficient potential to infuse the necessary hardening elements (i.e. carbon) into the case of the workpiece. In such processes, the carrier gas is a relatively stable gas allowing the introduction of the unstable hydrocarbon to maintain a slightly pressurized furnace atmosphere without deposition of soot. The carrier gas or endothermic-base atmosphere is generally defined by the American Society for Metals as one of a series of atmospheres designated as Class 300 carrier gas typically having approximate compositions of 40% nitrogen, 40% hydrogen, and 20% carbon monoxide. A typical analysis would be as follows:

40.4% $H_2$
19.8% $CO$
39.0% $N_2$
0.5% $CH_4$
0.2% $H_2O$
0.1% $CO_2$

An endothermic gas produced by the reaction of natural gas and air defined by the ASM as a Type 302 carrier gas has a composition by percent and volume of 39.8% nitrogen, 20.7% carbon monoxide, 38.7% hydrogen and 0.8% methane.

There are two widely-used commercial processes for generating an endothermic carrier gas. The first process, the nitrogen methanol process, mixes methanol with nitrogen in a vaporizer and the gas mixture is then heated in a catalyst-filled retort where the methanol reacts to yield hydrogen and carbon monoxide. Alternative variations of this process simply mix nitrogen and liquid methanol from storage facilities which react within the furnace to produce the nitrogen-based endothermic gas. While there are some safety considerations which favor the nitrogen-methanol process, the cost when compared with the other commercial process is high and the type of gas produced tends to be unsuitable as a reducing atmosphere for low temperature processes such as bright annealing and spherodizing. Thus, the more widely-used commercial process uses a gas generator to mix air with methane (natural gas) in the presence of a catalyst to generate an endothermic gas of a defined composition.

The typical gas generator, is a rather large arrangement which is located outside the furnace and which is used as a sole source of an endothermic gas which is piped to any number of standard furnaces, continuous or batch, located within the heat treater's facility. More specifically, the typical gas generator comprises a retort, filled with nickel based catalyst lumps which are disposed beneath a small bed of inert lumps of a heat transfer particulate such as $Al_2O_3$. Surrounding the retort is a source of heat. Natural gas and air are piped into the retort and externally heated to temperatures of approximately 1900° to 2200° F. to produce the product or carrier gas. The product gas must then be rapidly cooled below 900° F. before it is piped to the heat treat furnaces to avoid reversal of the reaction and formation of soot or carbon deposition (at temperatures of 1300° to 900° F.) in the gas carrying ductwork. The reheating of the gas within the furnace obviously requires more energy than that which would otherwise be required.

To overcome this inherent problem, and also to overcome several other disadvantages of the typical gas generator system, an in-situ or internal gas generator has recently been developed in Japan. From available publications, it appears that this gas generator is, of necessity, a small-sized unit so that it can be applied on a retrofit basis to the heat treatment chambers of existing furnaces without interfering with the work capacity of the furnace and yet generate a sufficient volume of atmosphere to effect the heat treatment process. The invention described herein is an improvement to such internal gas generators.

In considering the development of any internal gas generator where size of the unit must be minimized, the selection and design of the catalyst arrangement within the unit is critical. In this connection, it is known from the experiences gained in the manufacture of standard gas generators, that the reaction of air and natural gas proceeds in a two-step fashion with the initial reaction being slightly exothermic and the remainder of the reaction being endothermic. Thus, the selection, sizing and positioning of the catalyst within the retort must consider the impact of the two stage reaction. With respect to endothermic reactions, U.S. Pat. No. 2,423,907 discloses the mixing of various amounts of catalyst material with inert heat transfer material to provide the highest heat output at the beginning of the endothermic reaction and the highest catalyst concentration at the end of the reaction. It is also known by U.S. Pat. Nos. 3,796,655; 2,283,499 and 3,635,943 to use differently sized catalyst particles and non-catalytic heat transfer particles. It is also known to increase catalyst activity by increasing the amount of the catalyst particles within the bed such as shown in U.S. Pat. Nos. 2,142,835 and 2,256,622. Further, varying layers of heat transfer particles with layers of catalytic material is shown in U.S. Pat. Nos. 2,248,734 and 2,423,835. Where heat must be supplied for the reaction to proceed, the heat has been furnished directly to the beds by preheated, regenerating gases.

SUMMARY OF THE INVENTION

The present invention relates to a modular, endothermic gas generator for universal applications to and in combination with a standard, positive pressure, heat treat furnace. The furnace has a standard, sealed, heat treat chamber defined by its casing or furnace shell for heat treating metal workpieces therein by controlling the temperature of the workpiece and the composition of the gas atmosphere within the chamber. The gas generator in general includes an elongated, tubular reaction cartridge having a closed flanged end and an open, gas discharge end. An inlet is provided in the closed end for injecting gaseous reactants into the cartridge. Within the cartridge is a catalytic reaction mechanism for enhancing or speeding the production of an endothermic product gas. The gas generator also includes an elongated tubular heating memeber circumscribing and concentric with the reaction cartridge which has a flanged end adjacent the reaction cartridge's flanged end. A control arrangement is provided for controlling the ratio and composition of the reacting gases and the heat from the heating element to produce an endothermic product gas. By providing a mounting arrangement for releasably securing the cartridge and the heating element into an opening in the heat treating chamber by which the flanged ends of the reaction cartridge and the heating member are secured, it becomes a very simple operation to remove the reaction cartridge from the heating element to provide a replacement element should the catalyst become poisoned or the generator need servicing. Because the gas generators are not increased in size for the larger furnaces, but instead their number is simply increased, a standard, in-situ generator is provided for all differently sized atmosphere heat treat furnaces which modular construction permits a standard reaction cartridge to be applied to the gas generator with a minimum of furnace down time and spare part inventory. From an economic viewpoint, this feature of the invention is particularly important to commercial heat treaters where the cost of the workpieces being treated can far outweigh the cost of a much larger conventional gas generator retort without considering the inconvenience of the down time, etc.

In accordance with another aspect of the invention, the heat treat chamber is equipped with a conventional entry door and when the furnace is a two chamber furnace, a second door between the quench chamber and the heat treatment chamber is also provided. In accordance with known furnace operating procedures, when the door between the two chambers is opened to provide a transfer of work from the vestibule chamber into the heat treat chamber, the control arrangement for the gas generator is cycled into a purge mode. In the purge mode, the volume of air and natural gas introduced into the generator is approximately doubled thus doubling the capacity of the generator. However, since the residence time of the reactant gases within the generator will be halved, the purge gas will not have the characteristics of an ASM type 300 gas but nevertheless will be sufficient to provide a protective atmosphere suitable for purge purposes. The composition of the purge gas is characterized by being oxygen free while the endothermic carrier gas is characterized by having a $CO_2$ composition less than 0.2%. The composition of a typical purge gas generated by the internal gas generator is approximately 2.0% $CO_2$ while the composition of a typical endothermic gas produced by the generator would be 0.2% $CO_2$. The output of the generator in the purge gas mode would be 500 to 800 SCFH while the output of the generator in the endothermic carrier gas mode would be 250 to 400 SCFH. By controlling the operation of the generator of the invention in this manner, a lesser number of generators are required for any given size furnace.

In accordance with still another feature of the invention, the reaction cartridge is a cylindrical tubular member and the heating member includes a ring-shaped cylindrical casing having an inner cylindrical wall surface in close proximity to the reaction cartridge and an electric heating element within the ring-shaped casing extending the substantial length of the casing. Preferably, the control means is operative to cause the heating element to generate less heat over a portion of the ring-shaped casing adjacent the flanged end than the heat generated over the lengthwise portion of the ring-shaped casing which is spaced from the flanged end so that the gas reaction produced in the catalytic reaction mechanism is balanced over the length of the reaction tube. The reaction cartridge comprises a pipe secured at one end to the cartridge's flange to define a cylindrical chamber which is closed at the gas inlet end and open at the gas discharge end. The cylindrical chamber is divided into a plurality of longitudinally extending sections numbered $n_1$, $n_2$, $n_3$—$_{nn}$ and the heat transfer particulate matter is disposed in the odd numbered sections while a catalyst particulate is disposed in the even numbered sections. The first odd numbered section extends a longitudinal distance which is sufficient to permit the gaseous reactants to generate an exothermic reaction initiated by radiation heating from the heating elements. The even numbered sections progress in length to insure the endothermic reaction of the gaseous reactants. By sizing the particulate and catalytic sections with the output of the heating member sections, an equilibrium balanced gaseous product occurs at the end of the reaction tube and not in the heat treatment chamber, thus insuring a controllable process while insuring a minimally sized generator having dimensions not exceeding a length of approximately thirty inches and a diameter of not greater than approximately nine inches.

In accordance with another aspect of the invention the catalyst is chosen from a group comprising noble, metal elements except palladium and the temperature of the electric heating element which is in heat transfer relationship with the gaseous reactants is controlled so that the gaseous reactants are maintained at temperatures of approximately 1600°–1400° F. This is a significantly lower temperature than that of conventional nickel based retort catalysts and results in power savings.

In accordance with yet another feature of the invention, the gas generator is plumbed into existing furnace piping if the furnace uses fuel fired burners to supply heat for processing work in the heat treat chamber. In fuel fired furnaces, a conventional fuel supply arrangement including a safety valve train is provided for supplying a gaseous fuel to the burner. Similarly, a conventional air supply arrangement including a pump for pressurizing the combustion air and an air filter for removing contaminants from the combustion air is provided. The fuel and combustion air are then mixed to supply a combustible mixture to the burners. The internal gas generator only requires the addition of a gas mixer arrangement to the conventional or existing furnace piping. Fuel from the fuel supply arrangement and combustion air from the combustion air supply are piped to the gas mixer which mixes or meters the required fuel/air mixture to the gas generator.

In accordance with still another feature of the invention, the modifications of the standard fuel plumbing arrangement described above, not only permit easy installation of the generator on a retrofit basis, but also provide a significant savings in the cost of equipment otherwise required in a new fuel fired furnace installation. Lower capital costs coupled with the proven efficiencies of the gas generator during heat treating cycles places fuel fired heat treat furnaces on a very favorable economic cost analysis basis with furnaces operated with alternative energy forms, i.e. electric.

It is thus a principal object of the present invention to provide in combination with a standard atmosphere heat treat furnace, a standardized internal gas generator for retrofit application to the furnace or, alternatively for new applications, characterized by having a two-piece modular construction whereby the catalyst can be easily replaced.

It is another object of the invention to provide an internal gas generator for retrofit application to standard, heat treat furnaces which has a minimum length and width so not to adversely affect the capacity of the standard furnace.

Yet another object of the invention is to provide an internal gas generator in combination with standard heat treat furnace which develops an acceptable purge gas at approximately twice the flow rate of an endothermic product gas.

In accordance with yet another object of the invention, a minimally sized internal gas generator is provided which produces substantially 100% endothermic product gas before the gas reactants leave the gas generator.

It is yet another object of the present invention to provide an internal gas generator which does not produce excessive sooting and which requires minimal burnouts to clean the catalyst during the life of the generator.

It is yet another object of the invention to provide an internal gas generator in combination with a standard, fuel-fired heat treat furnace wherein the existing fuel/combustion air piping is used to provide the gaseous reactants to the gas generator.

It is still another object of the invention to provide an internal gas generator which can be quickly started when needed to produce an endothermic gas.

It is another feature of the invention to provide a long life gas generator.

It is another object of the invention to provide a gas generator for use in a standard, heat treat furnace which supplies only as much endothermic gas as needed during furnace operation to provide a protective atmosphere for the work, thus minimizing safety and environmental concerns about the operation of such gas generators and the venting of gases produced by such generators.

It is still another object of the present invention to provide a simple and inexpensive endothermic gas generator.

It is yet another feature of the invention to provide an internal gas generator which requires less power to operate when compared to conventional gas generators.

A still further object of the invention is to provide a gas generator and plumbing arrangement which lowers both the operating and processing costs of fuel-fired furnaces.

These and other objects and advantages of the present invention will become apparent in the following description taken together with the drawings which will be described in the next section.

DETAILED DESCRIPTION OF THE INVENTION

Figure 1:
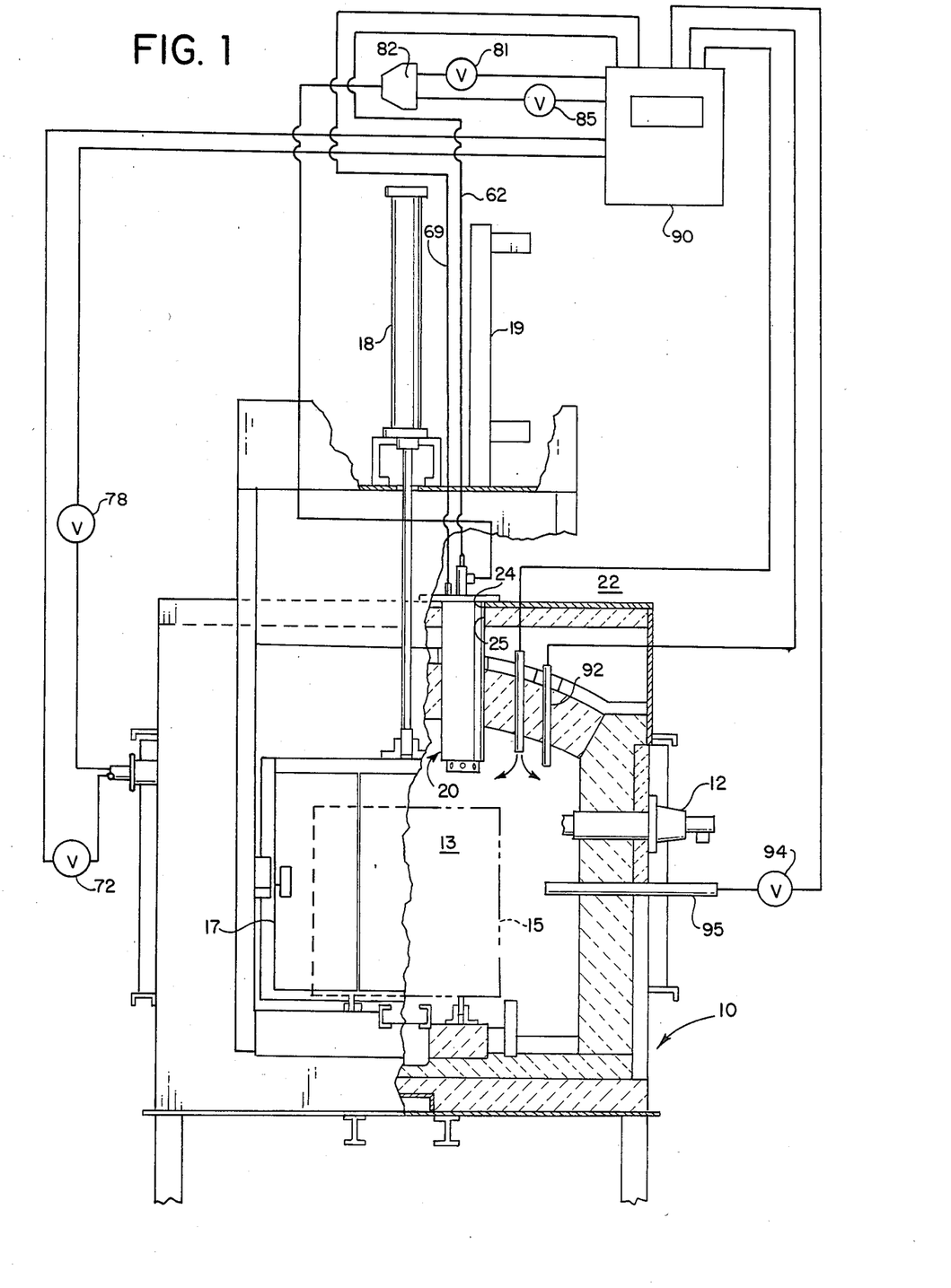
FIG. 1 is an end elevation view, partially in section, of a standard fuel-fired furnace with the gas generator of the present invention applied and schematically illustrating the control arrangement utilized for the furnace.

Referring now to the drawings wherein the showings are for the purpose of illustrating the preferred embodiment of the invention only and not for the purpose of limiting same, FIG. 1 shows a standard atmosphere furnace 10 of the type commonly manufactured under the trademark "ALLCASE". For purposes of describing the invention furnace 10 can be either of the batch or continuous type and may either be heated electrically such as by heating elements suspended within the furnace or by heating elements contained within tubes suspended within the furnace such as those manufactured under the trademark "PROLECTRIC" or as shown in the preferred embodiment by fuel-fired burners 12 which fire products of combustion into an enclosed tube which passes into and out of heat treat chamber 13 in a conventionally known manner. Typically, standard furnaces 10 of the batch type are rated by the hearth size or area of heat treat chamber 13 and more particularly by the area of the work basket which can be inserted into heat treat chamber 13 for heat treating workpieces 15 loosely placed therein. For reference purposes, such furnaces are typically sized by hearth dimensions of $24 \times 36$ inches, $30 \times 48$ inches, $36 \times 48$ inches, and $36 \times 72$ inches. Extending within heat treat chamber 13 is a gas generator 20 of the present invention. There is one such generator shown in FIG. 1 for a $30 \times 48$ inch heat treat chamber furnace 10. For a minimum size standard furnace, one generator 20 is contemplated while for the largest sized standard furnace given, two generators 20 would be used.

For definitional purposes, the furnace 10 shown in FIG. 1 is a multi-chambered arrangement with a charging or vestibule chamber located in front of heat treat chamber 13 (not shown) with access between the chamber controlled by door 17 controlled by hydraulic cylinder 18. Behind heat treat chamber 13 is a quench chamber (not shown) controlled by a second door (not shown) which in turn is actuated by a second hydraulic cylinder 19. (Alternatively, a two chambered furnace could be utilized. In a two chamber design, the quench chamber also doubles as the vestibule.) A furnace casing 22 surrounds the refractory hearth and has an opening 24 through which generator 20 extends and generator 20 is secured to furnace casing 22 as hereafter explained. Each generator 20 extends through an insulated opening 25 in furnace 10 and 20 generators in FIG. 1 are shown applied to the top raised insulated portion of heat treat chamber 13. For other standard heat treat furnaces, the generators might be applied through the side insulated portions of heat treat chamber 13.

Figure 2:
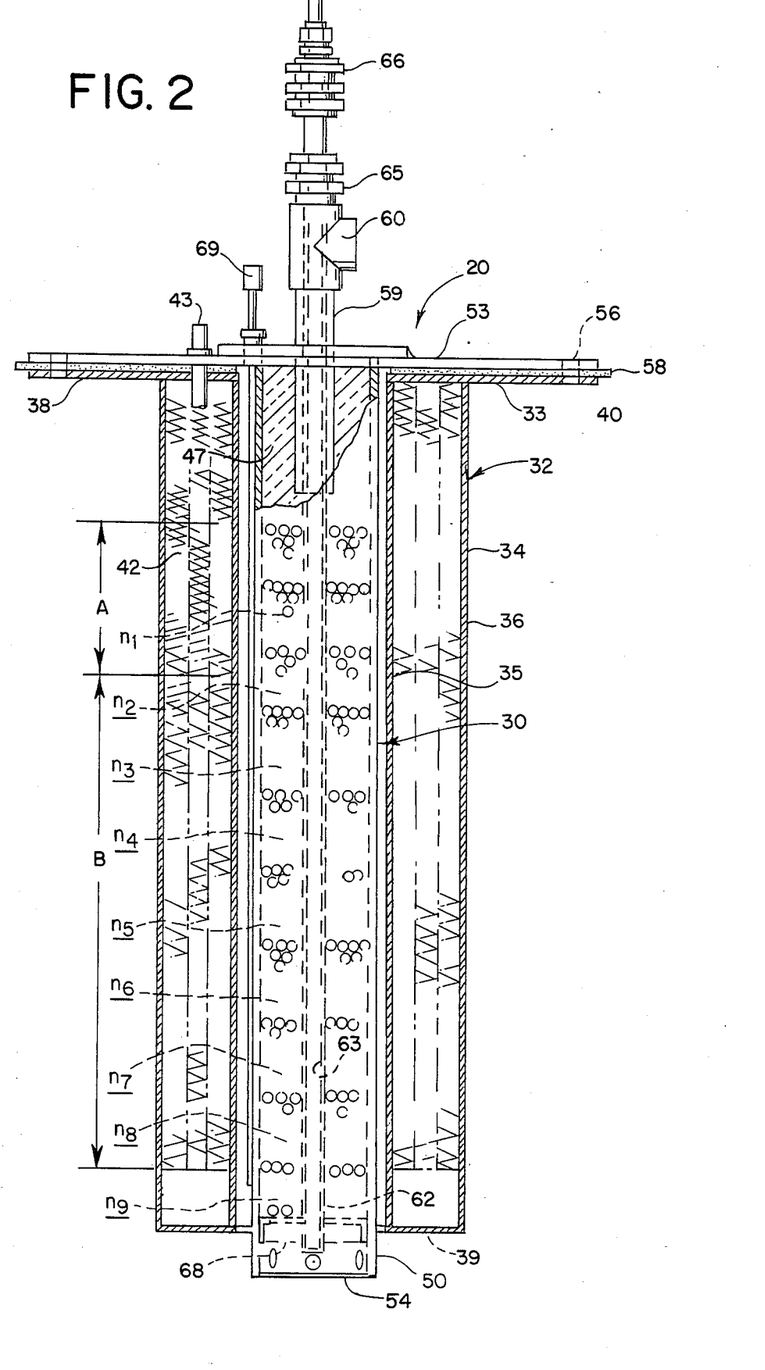
FIG. 2 is a plan view in section of the internal gas generator of the present invention.

Gas generator 20 is best shown in FIG. 2 as comprising a tubular reaction cartridge assembly 30 disposed within tubular heating element member 32 which circumscribes and is concentric with reaction cartridge assembly 30. In the preferred embodiment reaction cartridge 30 is a stainless steel pipe and tubular heating element member 32 is a ring-shaped cylindrical member.

More specifically, tubular heating element member 32 includes a ring-shaped casing 34 having an inner, longitudinally extending cylindrical surface 35 and an outer, longitudinally extending cylindrical surface 36. A circular flange 38 caps the top portion of ring-shaped casing 34 and the bottom of ring-shaped casing 34 has a closed end 39. Adjacent the outer edge of flange 38 are a plurality of holes 40 equally spaced about an imaginary circle for fastening tubular heating member 32 to furnace casing 22 by fastening means (not shown), such as by threaded fasteners or rivets. Disposed within ring-shaped casing 34 is a conventional heating element 42 with conventional plug-in leads 43 extending through circular flange 38 for supplying electrical power to heating element 42 to generate heat therefrom in a conventional manner. While an electrical heating element is preferrered for ease of controllability, other alternative sources of heat, such as heat from a fuel-fired burner, could be used in place thereof. In the preferred embodiment of the present invention, element 42 is shaped differently over a longitudinal portion of a ring-shaped casing 34 adjacent circular flange 38 and in the area designated as "A" in FIG. 2 than that portion of the element extending over the longitudinal distance of ring-shaped casing 34 designated as dimension "B" in FIG. 2 and extending from bottom closed end 39 of ring-shaped casing 34. Preferably, the kilowatt output of heating element 42 over dimension "A" per unit distances is less than that of heating element 42 over dimension "B" per unit distance for reasons which will hereafter be explained.

Tubular reaction cartridge assembly 30 includes a thin-walled, longitudinally extending, stainless steel tube or pipe member 50 centrally disposed in closely spaced relationship to ring-shaped casing 34. Pipe member 50 has a closed, top circular flange end 53 and an open bottom end 54. Top flange end 53 is concentric with circular flange 38 and has holes 56 aligned with the holes 40 in circular flange 38. A gasket 58 is provided between pipe flange 53 and circular flange 38 for mounting the generator in a sealed manner within furnace 10 as noted above. Centrally disposed within circular flange end 53 is a gas reactant inlet tube 59 which extends into pipe member 50 a distance slightly less than distance "A" heretofore defined. A standard Tee 60 is secured to gas reactant inlet tube 59 outside of pipe member 50 for supplying the gas reactants i.e., combustion air and methane, to the gas reactant inlet tube 59 for transmittal into pipe member 50. Disposed within pipe member 50 is a casing for reaction means comprising alternating packed beds of heat transfer particulate matter and catalytic particulates. These beds are designated by the letter "n" in FIG. 2 with the beds being alternated between heat transfer particles and catalytic particles with the heat transfer particles designated by odd number "n's" i.e., $n_1$, $n_3$, $n_5$, etc., and the catalyst particles designated by even number beds $n_2$, $n_4$, $n_6$, etc. The first bed adjacent the top closed circular flange end 53 is composed of a heat transfer particle extending longitudinally a distance approximately equal to dimension "A" with each successive heat transfer particulate bed decreasing in length while the beds of catalyst particles increase in length with the largest catalyst bed disposed adjacent open end 54 of pipe member 50 for reasons which will hereafter be explained.

Centrally disposed within the gas reactant inlet tube 59 is an aluminized gas sample tube 62 which extends to a point adjacent bottom end 54 of pipe member 50 and contains therein a quartz tube 63, generator 20 is provided with a male connector 65 and a union 66 permitting the tubes 62, 63 to extend past Tee 60 so that appropriate connections can be made to permit sampling of the product gas exiting generator 20. An inverted cup-shaped retainer member 68 is inserted into the bottom end of 54 of pipe 50 to maintain sampling tube 62 centered within pipe 50 and provide a screen for retaining the particulates "n" within pipe member 50 in the manner described. A thermocouple 69 extends through circular flange 53 between pipe member 50 and inner cylindrical surface 35 of ring-shaped casing 34 to a position adjacent closed end 39 of ring-shaped casing 34 for measuring the exit temperature of the product gas leaving gas generator 20.

Gas generator 20 produces endothermic gas by reacting natural gas (or other light hydrocarbons) with air at a ratio of one $O_2$ atom in the air to one carbon atom in the fuel. For natural gas, the air/fuel ratio is nominally 2.5/1. The reactant gases are preheated slightly by tubular heating element 32 over distance "A" as the gases travel the inlet tube 59 into the first bed of heat transfer particulate $n_1$, insulation 47 being disposed over the gas inlet to define the beginning point for dimension "A". During this time, or in the first step of the process, all of the oxygen is consumed but substantial quantities of $CO_2$ and $H_2O$ are formed. More specifically, $CO_2$ is formed in accordance with the reaction set forth in equation 1 below:

Equation 1:

$$CH_4 + O_2 \rightleftarrows CO_2 + 2H_2$$

$$\Delta H_{298} = -76.2 \text{ Kcal/mole}$$

which is exothermic. This reaction is believed to compete with a second reaction set forth in equation 2 below:

Equation 2:

$$CH_4 + 2O_2 \rightleftarrows CO_2 + 2H_2O$$

$$\Delta H_{298} = -192 \text{ Kcal/mole}$$

which is also exothermic. In the second step of the reaction which occurs as the reactant gases pass through the remaining beds $n_2$, $n_3$—$n_n$, the residual methane reacts with the $CO_2$ and $H_2O$ to lower the concentration of $CO_2$ and $H_2O$ back to the levels of the traditional endothermic gas. During the second step of the process, the reaction is endothermic and proceeds in accordance with the reactions set forth in equations 3 and 4 below:

Equation 3:

$$CH_4 + CO_2 \rightleftarrows 2CO + 2H_2$$

$$H_{298} = +40.8 \text{ Kcal/mole}$$

Equation 4:

$$CH_4 + H_2O \rightleftharpoons CO + 3H_2$$

$$H_{298} = +49.3 \text{ Kcal/mole}$$

The first reaction (i.e., equations 1 and 2) is very rapid and is slightly exothermic. It occurs for approximately one-third the longitudinal length of reaction cartridge assembly 30 (i.e., dimension "A") while the second reaction (i.e., equations 3 and 4) is slow and endothermic and occurs over approximately the remaining two-thirds of the longitudinal distance of reaction cartridge assembly 30 (i.e., dimension "B"). The endothermic reactions as set forth in equations 3 and 4 continue until the water gas equilibrium is established in accordance with the reaction set forth in equation 5 below:

Equation 5:

$$H_2O + CO \rightleftharpoons CO_2 + H_2$$

$$H_{298} = -9.8 \text{ Kcal/mole}$$

at which time, for definitional purposes, the reacting gases are now transformed into product gases. It is critical to the operation of the generator in a furnace environment that the water gas shift reaction proceed to equilibrium before the product gas is injected into heat treat chamber 13 because the heat treat process is controlled by the dew point (or as in the case of the invention, the oxygen content of the furnace atmosphere which is correlated to the dew point) or the $CO_2$ concentration of the furnace atmosphere, and should the reacting gases be still undergoing an equilibrium transformation in heat treat chamber 13 pursuant to the water gas shift reaction, inaccurate heat treat process readings will occur.

As explained thus far, the gas generator design must first preheat the reactant gases sufficiently to initiate the first exothermic reaction step with the gases in contact with the inert heat transfer particles in the first bed $n_1$. If the exothermic reaction step occurred in any of the catalyst beds, too much preheating will occur resulting in overheating at the initial catalyst bed $n_2$. Thus the reaction heat given off by the exothermic equations 1 and 2 raises the gas reactants' temperature above furnace temperature creating a hot band which is carefully controlled to occur substantially in bed $n_1$. Most of the reaction heat results in sensible heat in the gas reactants with the result that the entire gas stream is preheated to the reacting temperature. Without the initial reaction, there would be a "cold core" in the center of the generator where the gases would be colder. As the reactant gases travel through the remaining beds, their temperature tends to drop as the endothermic reaction proceeds. To maintain the reaction temperature, the beds are alternated with heat transfer particles and catalyst particles. Tubular heating element 32 provides a constant source of heat by radiation to both catalyst beds $n_2$, $n_4$, etc. and heat transfer beds $n_3$, $n_5$ etc. to minimize the temperature drop in catalyst beds $n_2$, $n_4$, etc. and raise the temperature of the reactant gases in heat transfer beds $n_3$, $n_5$, etc. to or slightly in excess of the reactant temperature.

In conventional endothermic gas generators, all efforts are made to avoid lower temperatures in the catalyst to avoid soot formation which can occur in accordance with the reaction set forth in equations 6 and 7 below:

Equation 6:

$$2CO \rightleftharpoons C + CO_2$$

$$\Delta H_{1400} + -40.7 \text{ Kcal/mole}$$

Equation 7:

$$H_2 + CO \rightleftharpoons C + H_2O$$

$$\Delta H_{1400} = -9.99 \text{ Kcal/mole}$$

Low temperatures can result due to radial temperature gradients in the catalyst bed. The gradients depend upon the required radial heat flux, the apparent thermal conductivity of the bed, and the bed diameter. Importantly, bed conductivity is very dependent upon the temperature and particle size with heat transfer increasing as the size of the particulates are increased. However, a second problem with heat transfer is the heat transfer to the center of the individual catalyst lumps. Porous catalysts have reactions proceeding within the lump and an endothermic reaction lowers the temperature of the lump internal. Thus it is necessary to maintain the center of the catalyst lumps sufficiently hot to avoid soot formation which will otherwise quickly degrade the catalyst by creating many fine particles or fines which in turn will cause catalyst abrasion and impede heat transfer, further increasing the rate of degradation, etc. In summary, the major parameters to be considered are catalyst activity, pore diffusion, carrier thermal conductivity and lump size.

Given the furnace size constraints required for installing, on a retrofit basis, gas generator 20 in existing standard furnaces, the generator must be not longer than approximately 30 inches and must not have a diameter greater than approximately 9 inches. The size limitation translates into a requirement that gas generator 20 be extremely active and, in particular, that a more active catalyst be used than the metal-based catalyst heretofore employed in order that the water gas equilibrium condition can occur within the generator. Noble metal catalysts such as platinum, palladium, ruthenium or rhodium are much more active than the base metal catalysts and will, at temperatures of approximately 1650° F., produce an endothermic gas of less than 0.2% $CO_2$ in a generator of the size noted and at an output of approximately 400 SCF/HR (Standard Cubic Feet Per Hour). Any of the noble metal element catalysts are believed acceptable with the exception of palladium which has been found to absorb oxygen at temperatures above 1300° F. This oxygen becomes tightly bound to the metal and is chemically stable. It is thus believed that palladium would not recover its catalytic activity in a gas generator after a burn out sequence and thus not be acceptable as a catalyst material for generator 20 operating at the temperatures specified.

More particularly, by considering all the matters noted and the influence of one design consideration upon the other, good operating results have been obtained in a gas generator design using a rhodium catalyst with a lump or particulate size of 0.125 inches and an inert material of alumina having a particulate size of 0.25 inches. Generator 20 had nine beds having longitudinally extending distances as follows:

| | | |
|---|---|---|
| $n_1 = 4.75''$ | $n_4 = 2.5''$ | $n_7 = 2.5''$ |
| $n_2 = 2.25''$ | $n_5 = 2.5''$ | $n_8 = 3.0''$ |
| $n_3 = 2.75''$ | $n_6 = 3.0''$ | $n_9 = 1.5''$ |

The tubular heating element developed 2.3 kw per hour over dimension "A" and 2.8 kw per hour over dimension "B". The generator developed 400 SCFH of a type 300 endothermic gas having a composition of 39% $H_2$, 39% $N_2$, 21% CO, 0.5% $CH_4$, 0.2% $CO_2$, within 10 minutes after initially starting the feed of the reacting gases into the generator and the generator developed a purge gas of 800 SCFH and a typical gas composition of 36% $H_2$, 42% $N_2$, 19% CO, 0.2% $CH_4$, 2% $CO_2$ and more specifically, an $O_2$ limit that did not exceed 0.0. With the generator operating at a temperature of 1800° F., no carbon sooting was uncovered and it would be expected that no more than 2 burn-outs of the unit per year of operation would be required. The generator had a low capacity limit of 100 SCFH, which would accommodate a turn-down ratio of a standard Allcase furnace of 4 to 1, permitting the furnace to operate in a wide variety of inert or slightly reducing atmospheres which is satisfactory for use in a wide variety of heat treat processes.

Figure 3:
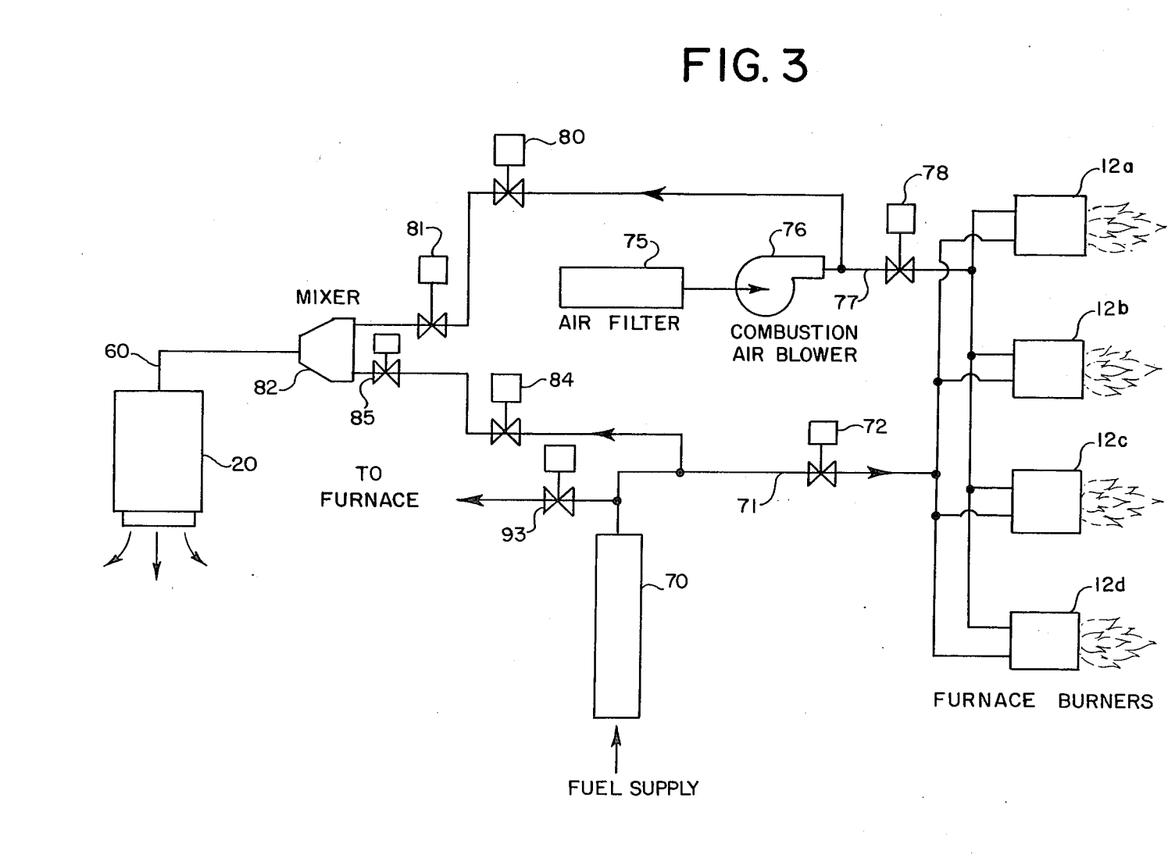
FIG. 3 is a schematic of the piping arrangement utilized in the furnace of FIG. 1.

The piping schematic illustrated in FIG. 3 discloses how the gas generator 20 can be integrated into an existing fuel/air supply arrangement for furnaces 10 which are fuel-fired. Natural gas, i.e., methane, is supplied to fuel-fired burners diagrammatically illustrated and numbered 12a, 12b, 12c, 12d through fuel supply means shown as including a fuel safety train valve arrangement 70, comprised of ball valves and a regulator to function as a shut-off arrangement in the event of fuel leakage. From fuel safety train arrangement 70 the fuel passes via conduit 71 through a regulator-metering orifice valve arrangement 72 to burners 12a, 12b, 12c, 12d. Combustion air is supplied through air supply means shown or including means for filtering air through filter 75, compressing the filtered air at blower 76 and then passing the combustion air by conduit 77 through an air supply metering valve-regulator arrangement 78 to burners 12a, 12b, 12c, 12d. The combustion air after leaving blower 76 is Tee'd off air supply line 77 through manually operated ball valve 80 through a motor operated valve 81 into a mixer 82. Similarly, the fuel after leaving fuel safety train 70 is Tee'd off of a fuel supply line 71 through a manually operated ball valve 84 to a motorized metering-regulator valve 85 to mixer 82 whereat the fuel and air are mixed into a fuel/air mixture which is conveyed to Tee 60 of the generator 20. In this manner, the need to supply a separate fuel safety train, or an air filter and a blower with its motor and the valving and fittings associated therewith are eliminated.

The operation of the entire furnace 10 including the generator 20 is controlled by a microprocessor 90 such as that currently marketed under the trademark CASEMATE which has sufficient input/output capacity to handle the additional controls of internal gas generator 20. That is, as shown in FIG. 1, the generator's thermocouple output 69 and the oxygen content sensed by sampling tube 62 in addition to the output of a thermocouple 93 in heat transfer chamber 13, and the oxygen content sensed by a gas sampling tube 92 in heat treat chamber 13 can all be sensed by microprocessor 90 and appropriate signals outputted to control the operation of the furnace 10 and the internal gas generator 20. The output signals include the control of the motorized valve 94 which regulates the flow of enriching gas such as by inlet 95 into heat treatment chamber 13 for carburizing processes and the like and in this respect acts as a balancing means. In addition to the control of the valve arrangements 72, 78 for the control of fuel and combustion air to burners 12 respectively, processor 90 is also capable of controlling mixer valves 81, 85 in addition to the control of the heating element 42 of generator 20.

It is thus the essence of the invention to provide a simple two-piece in-situ gas generator capable of generating an endothermic and purge gas for retrofit applications to standard atmosphere furnaces.

Having thus defined our invention, we claim:

1. A modular gas generator for universal application to and in combination with a standard, heat treating furnace, said furnace having a sealed heat treat chamber defined by its casing for heat treating metal workpieces therein by controlling the temperature of the workpiece and the composition of the gaseous atmosphere within said chamber, said gas generator comprising:
  (i) an elongated, tubular reaction cartridge having a closed flanged end and an open gas-discharge end, an inlet in said closed end for injecting gaseous reactants into said cartridge;
  (ii) catalytic reaction means disposed within said reaction cartridge for enhancing the production of an endothermic product gas;
  (iii) an elongated tubular heating member circumscribing and concentric with said cartridge and having a flanged end adjacent said flanged end of said cartridge;
  (iv) control means controlling the flow rate and composition of said reactant gases in said cartridge and the heat from said heating element to produce an endothermic product gas; and
  (v) mounting means for releasably securing said cartridge and said heating element into an opening in said heat treatment chamber and generally flush with said casing for replacement only of said cartridge in the event said catalytic reaction means become inoperative, and
  said cartridge is a cylindrical tubular member, said heating member includes a ring-shaped cylindrical casing having an inner cylindrical wall surface in close proximity to said cartridge, an electric heating element within said ring-shaped casing extending the substantial length thereof, said control means operative to cause said heating element to generate less heat over a portion of said ring-shaped casing spaced form said flanged end thereof whereby the gas reactions produced by said catalytic reaction means is balanced over the length of said reaction tube.

2. A modular gas generator for universal application to and in combination with a standard, heat treating furnace, said furnace having a sealed heat treat chamber defined by its casing for heat treating metal workpieces therein by controlling the temperature of the workpiece and the composition of the gaseous atmosphere within said chamber said gas generator comprising:
  (i) an elongated, tubular reaction cartridge having a closed flanged end and an open gas-discharge end, an inlet in said closed end for injecting gaseous reactants into said cartridge;

(ii) catalytic reaction means disposed within said reaction cartridge for enhancing the production of an endothermic product gas;

(iii) an elongated tubular heating member circumscribing and concentric with said cartridge and having a flange end adjacent said flanged end of said cartridge;

(iv) control means controlling the flow rate and composition of said reactant gases in said cartridge and the heat from said heating element to produce an endothermic product gas; and (v) mounting means for releasably securing said cartridge and said heating element into an opening in said heat treatment chamber and generally flush with said casing for replacement only of said cartridge in the event said catalytic reaction means become inoperative;

said reaction cartridge comprises a pipe secured at one end to said flange to define a cylindrical chamber closed at said gas inlet end and open at said gas discharge end, said cylindrical chamber divided into a plurality of longitudinally extending sections numbered $n_1, n_2—n_n$, a heat transfer particulate disposed in odd numbered sections, a catalyst particulate disposed in even numbered sections, a said first odd numbered section extending a longitudinal distance sufficient to permit said gaseous reactants to generate an exothermic reaction, said even numbered sections progressing in length to insure the endothermic reaction of said gaseous reactant.

3. The gas generator of claim 2 wherein said catalyst particulates is selected from the group of noble metals except for palladium.

4. The gas generator of claim 2 wherein said control means further includes a thermocouple disposed between said reaction chamber and said tubular member and extending therebetween to a point slightly inward of said open end of said reaction cartridge whereby the temperature of the product gas is sensed prior to exiting said open end of said reaction chamber.

5. The gas generator of claim 2 wherein said control means further includes a sample tube centrally disposed within said inlet tube and extending within said reaction chamber to a point generally adjacent said open end, and sensing means associated with said sample tube to measure the oxygen, $CO_2$ or dew point, of said product gas.

6. The gas generator of claim 2 wherein said n numbered sections comprise nine in number and have the approximate length of $n_1 = 4.75''$
$n_2 = 2.25''$
$n_3 = 2.75''$
$n_4 = 2.5''$
$n_5 = 2.5''$
$n_6 = 3.0''$
$n_7 = 2.5''$
$n_8 = 3.0''$
$n_9 = 1.5''$ and the outside diameter of said gas generator does not exceed approximately 9" and the overall length of said gas generator within said furnace does not exceed approximately 30 ".

7. The gas generator of claim 2 wherein said cartridge is a cylindrical tubular member, said heating member includes a ring-shaped cylindrical casing having an inner cylindrical wall surface in close proximity to said cartridge, an electric heating element within said ring-shaped casing extending the substantial length thereof, said control means operative to cause said heating element to generate less heat over a portion of said ring-shaped casing spaced form said flanged end thereof whereby the gas reactions produced by said catalytic reaction means is balanced over the length of said reaction tube.

8. The gas generator of claim 2 wherein said control means includes means for producing on ASM Type 300 endothermic gas at a rate of about 250–400 CFH and a purge gas having no more than about 0.0% oxygen content at a rate of about 500–800 CFH.

9. The gas generator of claim 8 wherein only one gas generator develops sufficient purge and endothermic gas quantities for operating standard furnaces having a hearth size of about 36"×48" and only two gas generators will together develop sufficient purge and endothermic gas quantitative for operating standard furnace in excess of a hearth size of about 36"×48" to a hearth size of about 36"×72".

10. The gas generator of claim 2 wherein said furnace has gas from burners and said control means include (a) a conventional safety valve train for controlling the flow of a gaseous fuel;

(b) one air filter and one blower for providing a single source of filtered compressed air;

(c) motorized burner valve means controlling the flow of air and fuel to said gas burners;

(d) a mixer in fluid communication with said gas generator downstream of said burner valve means for mixing a predetermined amount of fuel and air for said gas generator;

(e) a manually adjustable air valve upstream of said air blower but downstream of said burner valve means and said mixer, and a manually adjustable fuel valve upstream of said safety valve train but downstream of said burner valve means and said mixer;

(f) an air valve upstream of said manually adjustable air valve and downstream of said mixer for controlling the flow of filtered air to said mixer;

(g) a metering-regulator valve downstream of said mixer and upstream of said manually adjustable fuel valve for controlling the flow of fuel to said mixer;

(h) thermocouple and oxygen sensing means within said furnace for sensing, respectively, the temperature and oxygen control of the furnace atmosphere; and (i) microprocessor means controlling said motorized burner valve means in interdependent relationship with said motorized metering-regulator valve and said motorized air valve in response to said thermocouple and oxygen sensing means to provide a furnace turn down ratio of 4 to 1.

11. An in situ, internal gas generator for use in an industrial heat treating furnace comprising:

(i) an in situ removable and replaceable modular tubular reaction cartridge mounted generally flush with the furnace casing and extending no more than a fixed distance into said furnace, said reaction cartridge having an inlet at one end for receiving gaseous reactants, an outlet at the opposite end for discharging a gaseous furnace atmosphere gas into said furnace and reaction means within said reaction tube for reacting said gases in a controlled manner to produce said furnace atmosphere gas;

(ii) an electric tubular member surrounding and extending approximately the length of said reaction cartridge for heating said reaction cartridge;

(iii) control means for controlling the rate and ratio of said reactant gases and said electric tubular member to produce said furnace atmosphere gas prior to leaving said outlet end; and (iv) said control means in combination with said reaction means effective to produce an endothermic gas having a $CO_2$ composition less than 0.2% and a purge gas at twice the rate that said endothermic gas is produced, said purge gas having a $CO_2$ composition in excess of 0.2% and an $O_2$ composition less than 0.0%.

12. The gas generator of claim 13 wherein said catalyst is rhodium with a particulate size of about 0.125 inches and said inert material is alumina with a particulate size of about 0.25 inches.

13. The gas generator of claim 11 wherein said reaction cartridge comprises a pipe secured at one end to a flange at the mounting end of said reaction cartridge to define a cylindrical chamber closed at said gas inlet end and open at said gas discharge end, said cylindrical chamber divided into a plurality of longitudinally extending sections numbered $n_1$, $n_2$—$n_n$, a heat transfer particulate disposed in odd numbered sections, a catalyst particulate disposed in even numbered sections, said first odd numbered section extending a longitudinal distance from said flanged end a sufficient to permit said gaseous reactants to generally decrease in length to insure the endothermic reaction of said gaseous reactant; and said catalyst particulates are selected from the group of noble metals except for palladium.

14. The gas generator of claim 13 wherein said n numbered sections comprise nine in number and have the approximate length of $n_1 = 4.75''$
$n_2 = 2.25''$
$n_3 = 2.75''$
$n_4 = 2.5''$
$n_5 = 2.5''$
$n_6 = 3.0''$
$n_7 = 2.5''$
$n_8 = 3.0''$
$n_9 = 1.5''$ and the outside diameter of said gas generator does not exceed approximately 9″ and the overall length of said gas generator within said furnace does not exceed approximately 30″; and the generator produces approximately 400 SCFH of ASM class series 300 endothermic gas and 800 SCFH of said purge gas.

15. The gas generator of claim 14 wherein said cartridge is a cylindrical tubular member, said heating member includes a ring-shaped cylindrical casing having an inner cylindrical wall surface in close proximity to said cartridge, an electric heating element within said ring-shaped casing extending the substantial length thereof, said control means operative to cause said heating element to generate less heat over a portion of said ring-shaped casing spaced form said flanged end thereof whereby the gas reactions produced by said catalytic reaction means is balanced over the length of said reaction tube.

16. The gas generator of claim 11 wherein said furnace has gas from burners and said control means include (a) a conventional safety valve train for controlling the flow of a gaseous fuel;

(b) one air filter and one blower for providing a single source of filtered compressed air;

(c) motorized burner valve means controlling the flow of air and fuel to said gas burners;

(d) a mixer in fluid communication with said gas generator downstream of said burner valve means for mixing a predetermined amount of fuel and air for said gas generator;

(e) an adjustable air valve upstream of said air blower but downstream of said burner valve means and said mixer, and a manually adjustable fuel valve upstream of said safety valve train but downstream of said burner valve means and said mixer;

(f) an air valve upstream of said manually adjustable air valve and downstream of said mixer for controlling the flow of filtered air to said mixer;

(g) a motorized metering-regulator valve downstream of said mixer and upstream of said manually adjustable fuel valve for controlling the flow of fuel to said mixer;

(h) thermocouple and oxygen sensing means within said furnace for sensing, respectively, the temperature and oxygen control of the furnace atmosphere; and (i) microprocessor means controlling said motorized burner valve means in interdependent relationship with said motorized metering-regulator valve and said motorized air valve in response to said thermocouple and oxygen sensing means to provide a furnace turn down ratio of 4 to 1.

* * * * *